Figure 8:
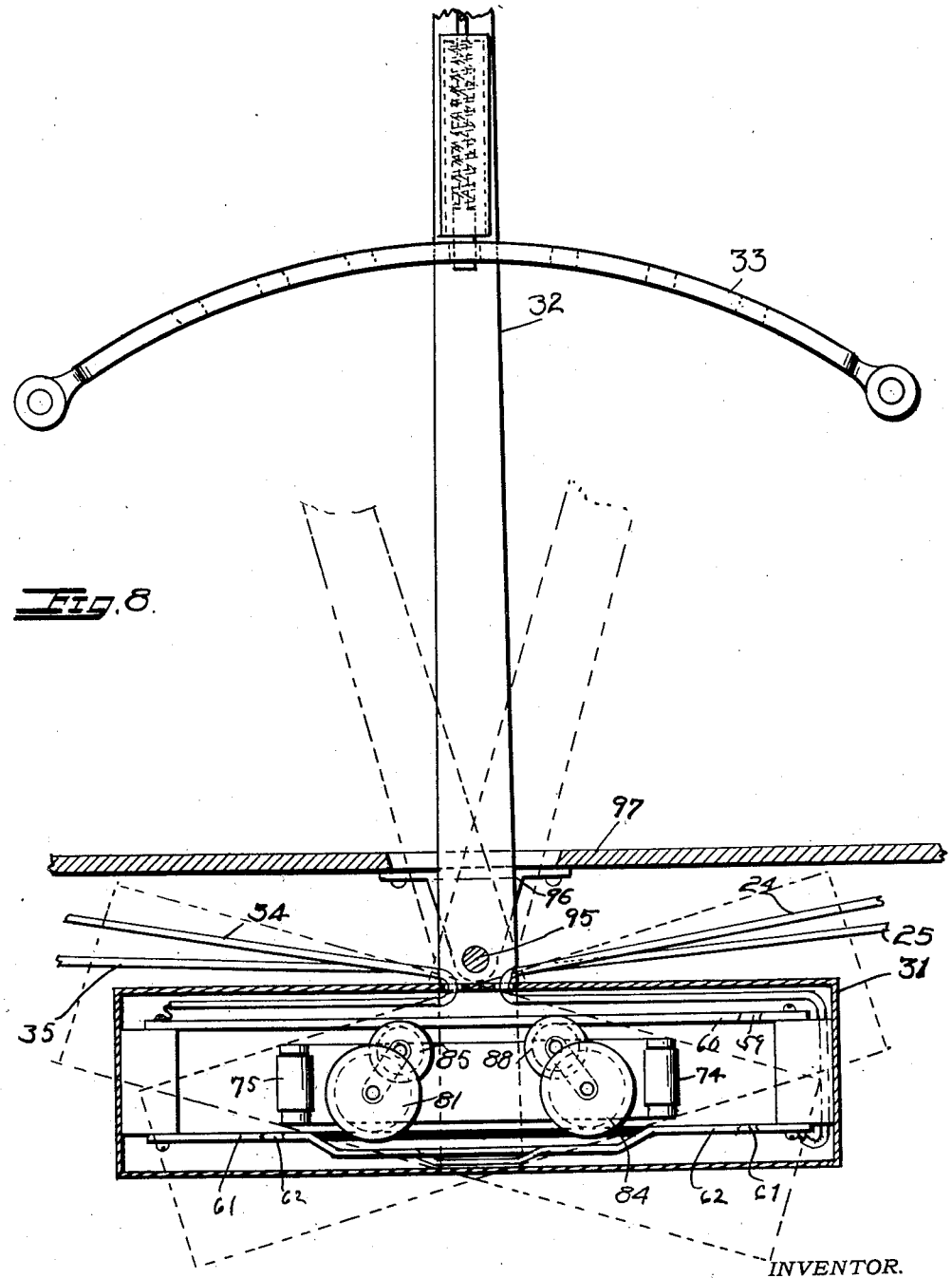

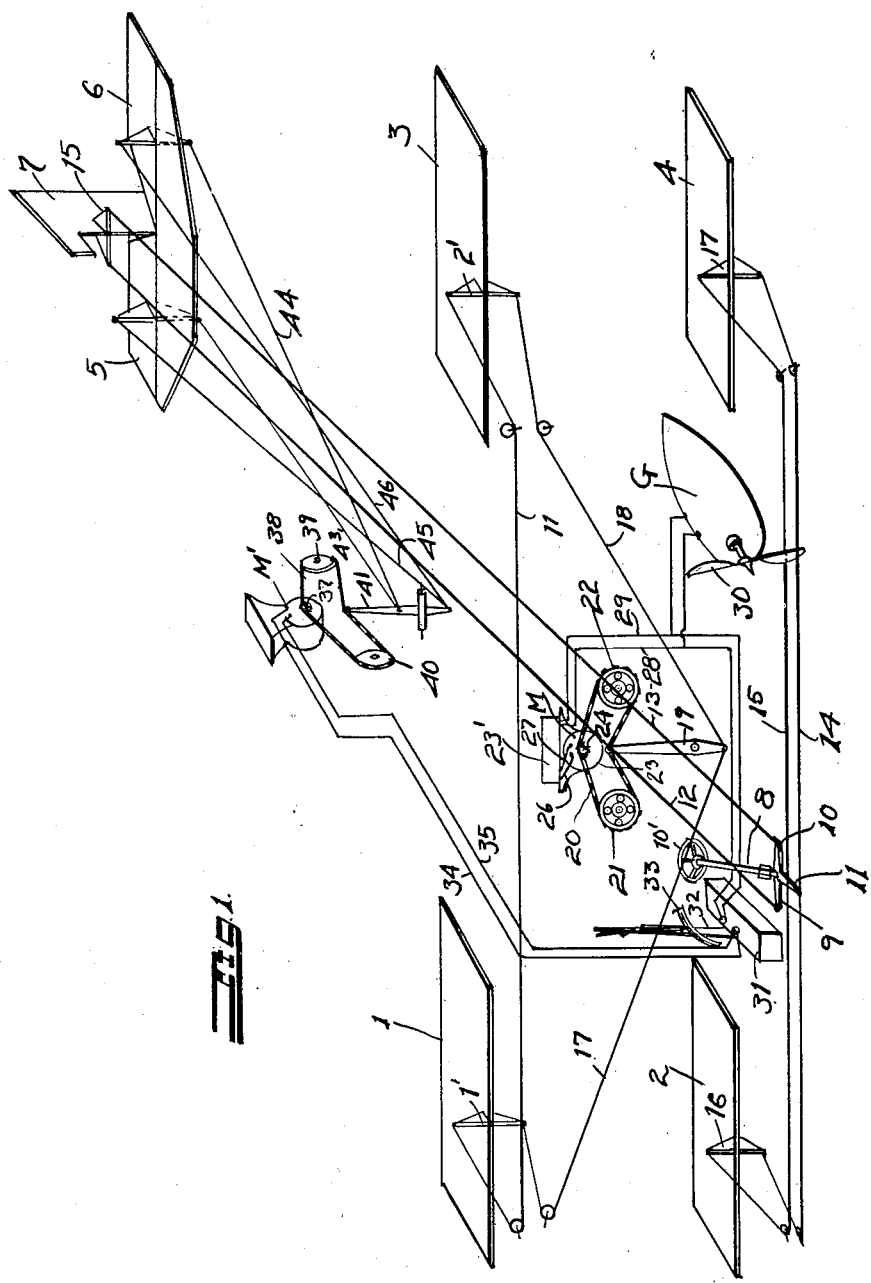

Feb. 25, 1930.　　　　　A. L. VEIT　　　　　1,748,502
AUTOMATIC AIR VEHICLE STABILIZER
Filed Nov. 5, 1927　　　7 Sheets-Sheet 2
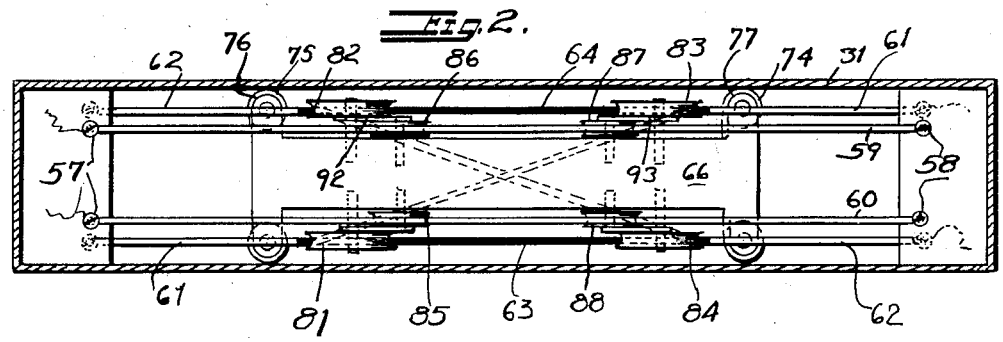
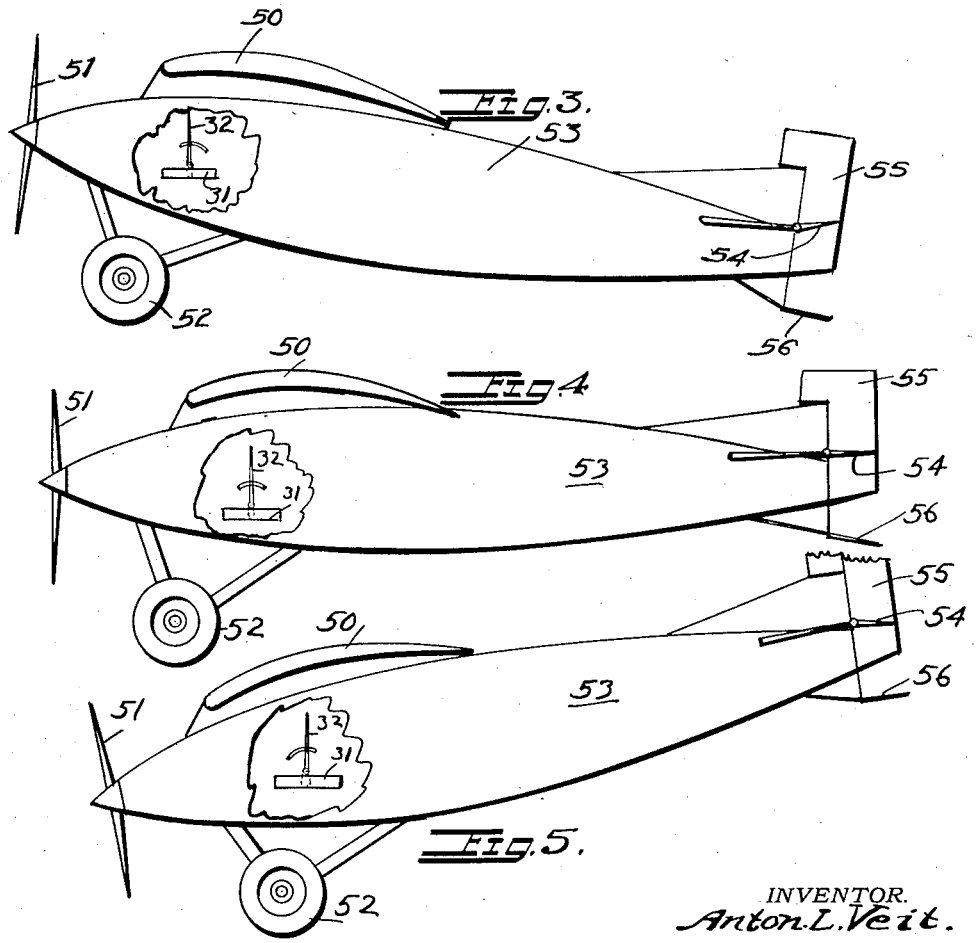
INVENTOR.
Anton L. Veit.
BY
Carlos P. Griffin
ATTORNEY.

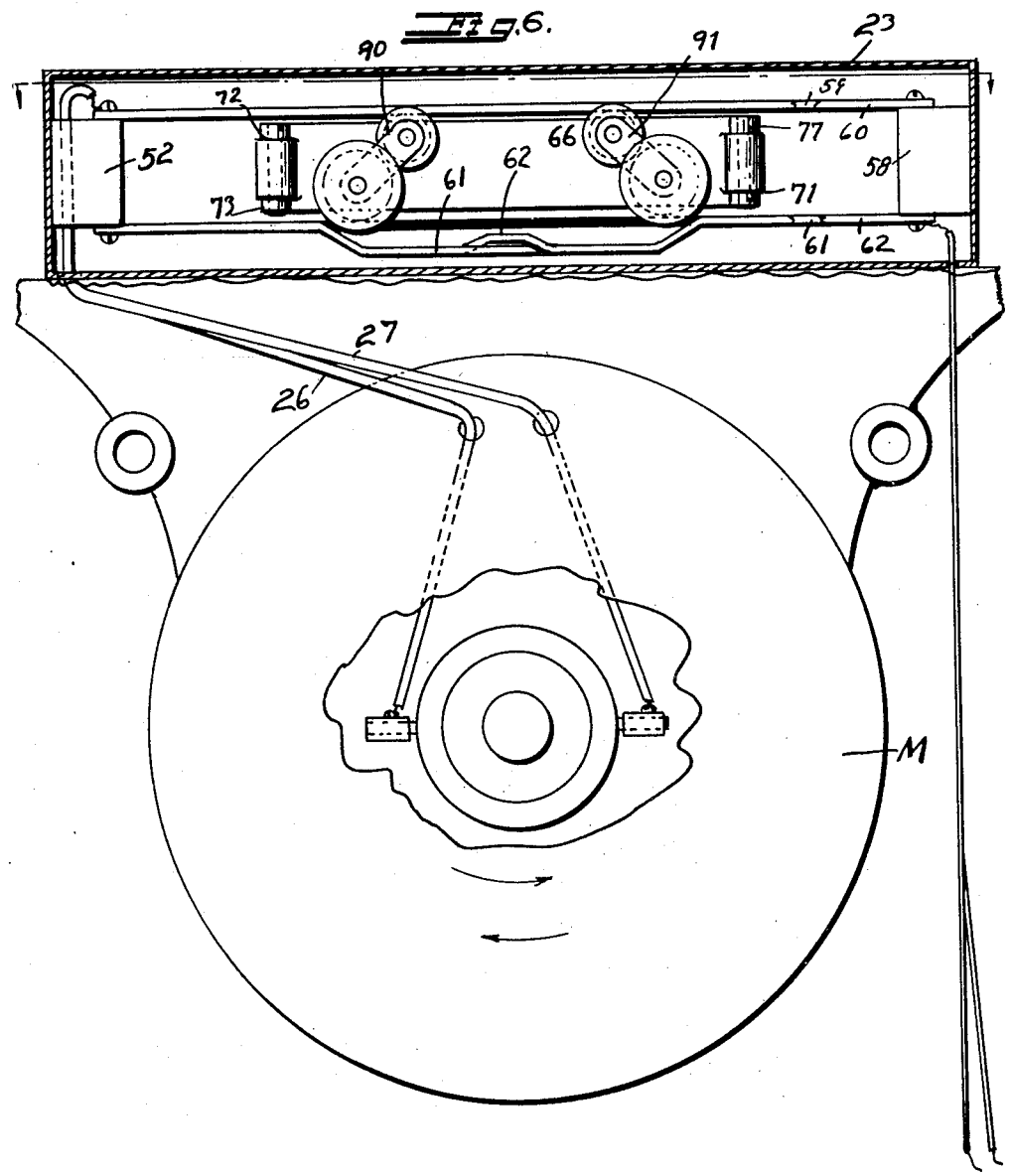

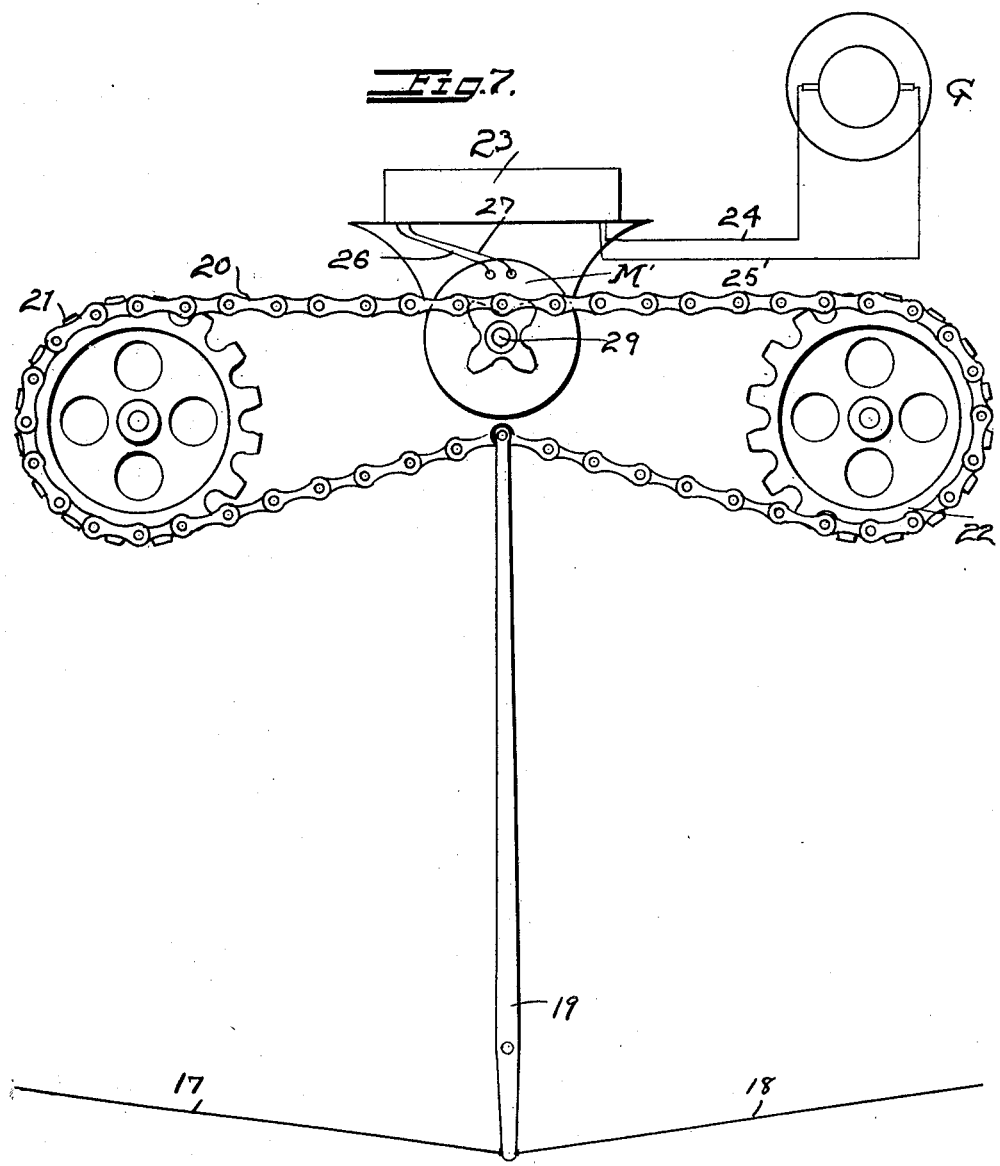

Feb. 25, 1930.  A. L. VEIT  1,748,502
AUTOMATIC AIR VEHICLE STABILIZER
Filed Nov. 5, 1927  7 Sheets-Sheet 5

INVENTOR.
Anton L. Veit.
BY
Carlos P. Griffin
ATTORNEY.

Feb. 25, 1930. A. L. VEIT 1,748,502
AUTOMATIC AIR VEHICLE STABILIZER
Filed Nov. 5, 1927 7 Sheets-Sheet 6
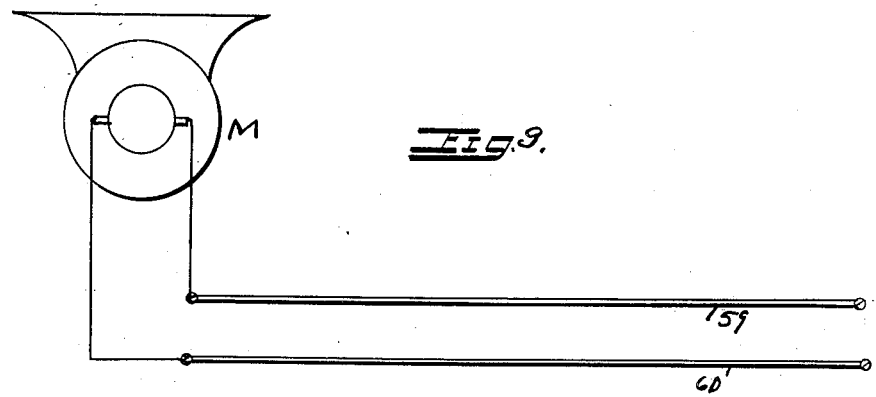
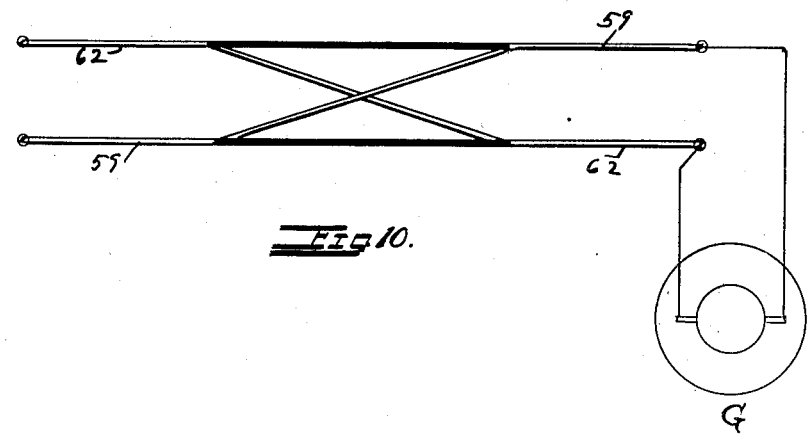
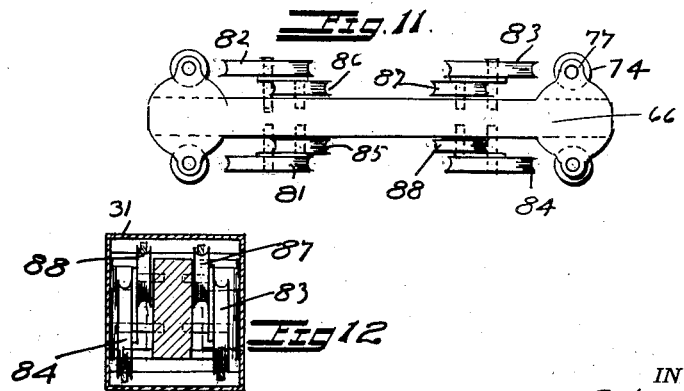
INVENTOR.
Anton L. Veit.
BY
Carlos P. Griffin
ATTORNEY.

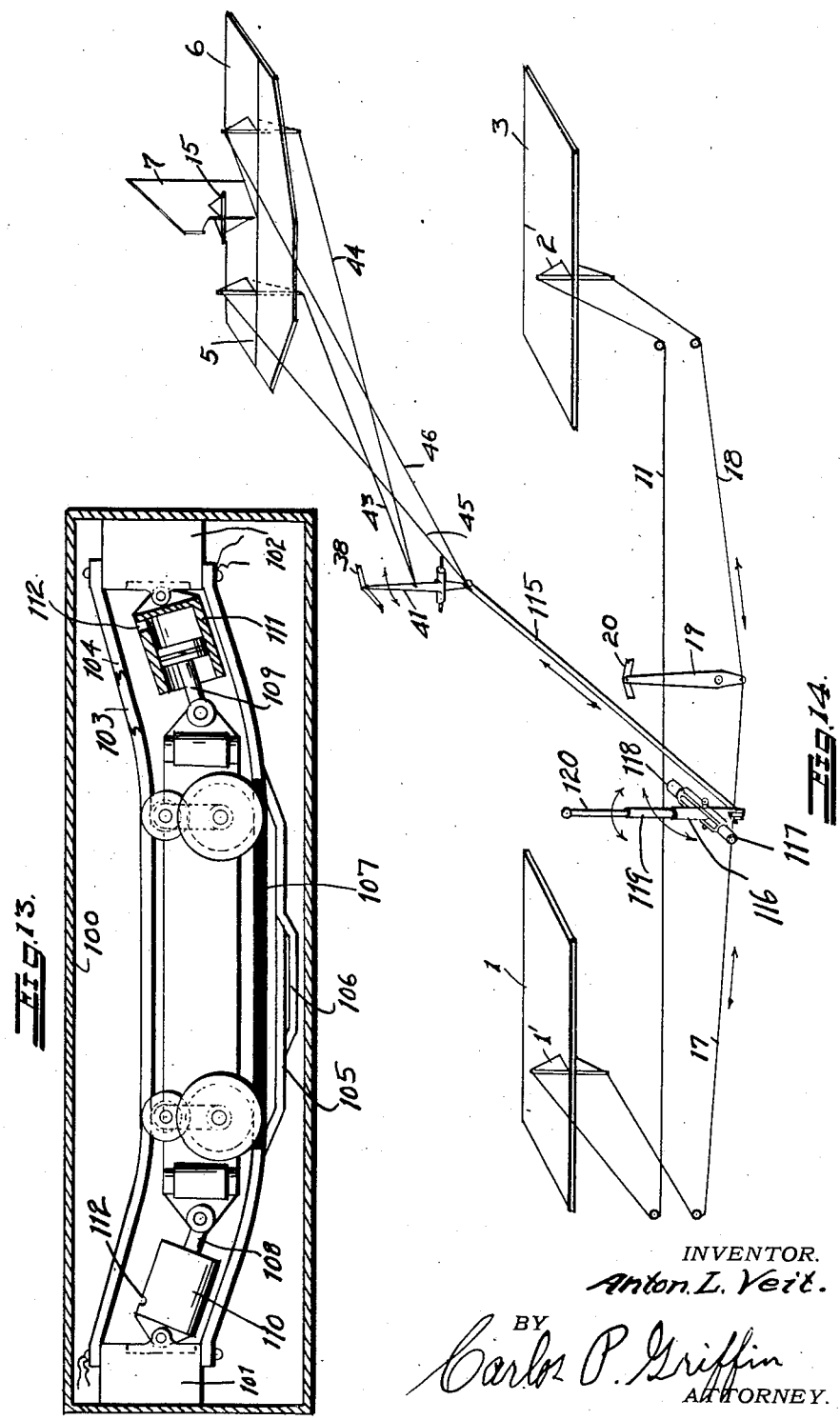

Patented Feb. 25, 1930

1,748,502

UNITED STATES PATENT OFFICE

ANTON L. VEIT, OF SAN FRANCISCO, CALIFORNIA, ASSIGNOR OF ONE-HALF TO WILLIAM WAGNER, OF SAN FRANCISCO, CALIFORNIA

AUTOMATIC AIR-VEHICLE STABILIZER

Application filed November 5, 1927. Serial No. 231,241.

This invention relates to an automatic air vehicle stabilizer, and its object is to provide means whereby the air vehicle can be so automatically operated that it is kept from traveling downwardly when it should travel substantially horizontally to cause it to travel upwardly at will, or to cause it to travel downwardly if it is to go to a lower level, or to land upon the ground.

It is an object of the present apparatus to provide both for the front and back regulation of the air vehicle, and to provide for its lateral regulation since that is an important function with respect to aeroplanes.

It is a further object of this apparatus to provide for the automatic operation of the air vehicle, and at the same time not to put the hand operation of the vehicle out of commission, but to allow the hand operation of the vehicle to take place if desired, or to put them entirely in control of the automatic operation to enable the air vehicle to remain in the air as long as may be desired, and to prevent unexpected landings in the fog.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a perspective view of a diagrammatic arrangement of the control apparatus, the ailerons, elevator and runner with their diagrammatic controls being shown, Figure 2 is a plan view of the casing within which the control apparatus is contained, Figure 3 is a diagrammatic view of an aeroplane and this apparatus applied thereto showing the aeroplane ready to rise off the ground, Figure 4 is a view similar to Figure 3 showing the aeroplane ready to move along substantially horizontal, Figure 5 is a view similar to Figure 3 with the control set to permit the aeroplane to land, Figure 6 is a diagrammatic view of one of the control motors showing the control mounted thereon in a casing just above the motor, the same motor and control being capable of being used for both controls if desired, but in the present case an adjustable control is used for the elevation or depression of the aeroplane, Figure 7 is a diagrammatic view on a slightly larger scale of the lateral control motor and lever, Figure 8 is a view partly in section of the elevating and depressing control showing the means for regulating the same, Figure 9 is a diagrammatic view of the upper controls in each of the control casings, Figure 10 is a diagrammatic view of the tracks and conductors in the lower part of the control casing of each of the controls, Figure 11 is a plan view of the truck used as a level in each control casing, Figure 12 is an end view in section of the same truck the casing within which the truck moves, Figure 13 is a modified form of leveling device in which the apparatus is arranged to slightly retard the action of the leveling truck, and Figure 14 is a diagrammatic perspective view of a form of the control in which hand operation in the event of a failure of the automatic operation is superposed upon the entire control system.

In Figure 1 there is a complete showing in diagram of all of the controls affected by the operation of this stabilizing mechanism as used upon a well known form of biplane. This figure, the numerals 1 to 4 inclusive indicate the pivoted ailerons at the back edges of each of the wings. 5 indicates one of the elevators and 6 the other, while the rudder is indicated at 7.

It will be understood by those skilled in the art that each of these pieces of apparatus is pivotally connected to the adjoining part of the aeroplane and is operated by a series of cables. The hand wheel for steering the aeroplane is shown at 8, and it has the levers 9, 10 and 11 which operate upon the cables 12, 13 and 14 although the cable 15 forms a part of the mechanism of the cycle of movement produced by the cable 14. The cables 12 and 13 are connected to a horn 15 on the front of the rudder 7, the arrangement being such that the steering bar 15 extends on both sides of the rudder far enough to turn the latter properly, while at the front end the cables 12 and 13 are connected to the bar 10.

The cables 14 and 15 are connected at opposite ends to the horns 16 and 17 which serve to operate the ailerons, said cables being operated by hand from the lever 11, all operated by the steering wheel 10'.

The upper ailerons 1 and 3 are operated through the aid of horns 1' and 2' which extend on both sides of said ailerons, and said horns are connected together by a cable 11, and by cables 17 and 18 at the bottom. The cables 11 and 18 are connected to a lever 19, which lever is operated by the sprocket chain 20, the latter passing over two sprocket wheels 21 and 22. The lever 19 is pivotally mounted on some fixed part of the aeroplane, and its upper end is pivotally connected to the chain 20, so that as the chain is pulled in one direction or the other, one of the ailerons will be raised and the other lowered by the motor M'. The motor M has a small casing 23 thereover within which the automatic leveling to the motor is mounted. This motor has a sprocket wheel 24 to drive the chain 20.

The motor is driven through current supplied thereto by the two wires 26, 27 which are connected to the rails inside the casing 23 and at the other end the current is supplied to the rails within said casing by the wires 28, 29 which lead from the generator plate, the latter being driven in the present instance by an air driven propeller 30. The wires 28, 29 also supply current to the leveling device within the casing 31, and this casing is pivotally supported and regulated by the lever 32, an arc 33 carrying notches enabling the lever to place the casing 31 in any desired position. Wires 34, 35 extend from this casing to the motor M' which is supported from a bracket inside of the fuselage of the areoplane.

In this instance the motor is supplied with the sprocket wheel 37 which drives the sprocket chain 38 which passes over two wheels 39 and 40, and This lever has two sets of cables connected thereto 43, 44 for the downward inclination of the elevators 5 and 6 and 45, 46 for the upward inclination of the elevators 5 and 6.

The wings of the aeroplane are shown at 50, Figures 3 to 5 inclusive, the motor driven propeller at 51, the ground supporting wheels 52, the fuselage at 53, one elevator at 54 and the rudder at 55 and the drag at 56. The fuselage is broken away to show the lever 32 and the casing 31 within which the elevating and depressing leveling apparatus is installed.

It will be seen that in Figure 3 the automatic apparatus is set to cause the aeroplane to rise. In Figure 4 the automatic regulating apparatus is set to cause the aeroplane to travel upon a level, and in Figure 5 this apparatus is set to cause the aeroplane to dip enough to land. Both of the automatic regulating casings are the same in internal construction, except that 31 is pivotally mounted to enable the operator to rise, travel forward on a level or descend as he may desire. Whereas the casings 23 and 31 are mounted in a fixed position with respect to the axis of the aeroplane, the casing 31 will be next described.

The casing 31 is substantially rectangular in shape, and has an insulating block 57, 58 at the ends with two continuous electrical leads 59 and 60 extending from the top of one block to the top of the other and these leads are in turn connected to the motor leads 26, 27.

At the bottom of the blocks 57, 58 there are two tracks and controllers 61, 62, which tracks extend from one block to the other, but they are depressed in their middle portion and each crosses to the other side of the next adjacent block so that at the center the track 62 shows passing over and behind the track 61 (note Figure 6).

At the depressed portion of these two tracks there are two supporting insulating bars 63, 64, said bars connecting the track 62 with the track 61 to provide continuous supporting tracks for the truck 66. The truck 66 is made of any suitable heavy insulating material to respond readily to changes in inclinations and at its end it has eight rollers as indicated at 70 to 77 inclusive.

The rollers just mentioned are for the purpose of enabling the truck to move in the casing with as little friction as possible. In addition to the rollers just mentioned the truck is supported on the non-conductor tracks by the wheels 81 to 84 inclusive, and connection is made continuously with the overhead conductor tracks 59 and 60 by the small wheels 85 to 88 inclusive all of said wheels being mounted upon pins extending into the body of the truck or block 66. Electrical connection between the wheels is made by four plates 90, 91, 92 and 93. The casing 31 is substantially the same in internal construction as the casing 23 except that it is supported by a pivot pin 95 and the inlet leads 24, 25 as well as the outlet leads 34, 35 extend thereinto through openings approximately at the center of the casing to prevent any undue bending of the cables. This casing is supported by a bracket 96 which depends from the front 97 of the fuselage.

The two trucks or blocks in the casing 23—31 are mounted to move with the least possible friction and it will be seen that as soon as the truck is centrally placed that its wheels will contact with the non-conducting bars, but if there is the slightest tendency of the aeroplane to turn one way or the other with respect to the lateral movement of the truck in the casing 23 or if it tends to pitch up or down with respect to the truck in the casing 31, the truck wheels will cause current to be sent to the motor M or the motor M' as the case may be. This will cause every motor to be energized to rotate and correspondingly pull the control apparatus of the aeroplane to bring the plane upon an even keel or to cause it to rise or fall as may be desired by the operator in the handling of the lever 32. In the present instance a small sprocket gear has been shown as applied to the motors M and M', but in actual practice a gear with a much greater reduction than that would ordinarily be used or else some kind of an internal gear reduction inside the motor casing, but this forms no part of the present invention.

It will be very apparent that the form of control shown in Figures 6, 8, 9 and 10 will be very responsive, but it may be necessary at times to somewhat reduce this responsiveness in order to prevent a too rapid shifting of the plane controls from one position to another position and this is effected by the form of apparatus shown in Figure 13. In this figure the casing for the control truck is shown at 100, and it has the two insulating blocks 101, 102 at its ends. These blocks are connected with the conductors 103, 104 at the top substantially the same as the previous form of the conductors at the top of the control casing but they are bent downwardly so that each end will be inclined upwardly from the center. At the bottom of the blocks there are the two crossed over conductors 105, 106 which form the means to complete the circuit through the truck wheels. This truck also runs on an insulated rod 107, the same as the truck illustrated in the previous figures, and the numbers of its parts are the same as shown in those figures except that at each end it is provided with a pivotally mounted piston rod as indicated at 108, 109. The pistons operate in two air dash pots 110, 111, each dash pot having an opening as indicated at 112 to retard the action.

It will be seen from the construction just described that the truck forming the connection from one series of conductors to the other will have to run up hill slightly at each end and this will tend to restore the truck to the inoperative position, while the dash pots will prevent it from operating too quickly in either direction, and thereby prevent a too rapid action of the control mechanism.

In Figure 14 a portion of the controls shown in Figure 1 are illustrated with the application thereto of means for hand operation in the event that the automatic operation fails for any reason. In this figure the control apparatus is numbered the same as in Figure 1 except that in addition to the matter shown in Figure 1 a rod 115 extends from the bottom of the control lever 41 to the bottom of a pivoted control lever 116, and this control lever is pivoted to move forward and back to operate the lever 41, while it is also mounted on suitable pivots 117, 118 which permit a lateral movement of the same lever, its lower end being connected to the control cable 17 on one side of the lever 19 thereby making it possible to operate both of these controls from one lever.

In order to have this control out of the way as much as possible it is provided with two telescopic handles 119, 120 the latter of which slide into the handle 119 and both of which slide into the lever 116.

Having thus described my invention what I desire to secure by Letters Patent of the United States is as follows, but modifications may be made in carrying out the invention as shown in the drawings and in the above particularly described form thereof within the purview of the annexed claims:

1. Means for the automatic operation of the controls of an aeroplane, comprising a pivoted casing, a pair of electrical conductor rails in the lower portion of said casing, each of said rails having a central depressed crossover portion, an insulated portion for each rail over the crossover portion, an insulator truck having conductor wheels engaging said rails, a pair of conductor rails above said truck, conductor wheels in contact with said upper rails, electrical connections between the upper and lower wheels, electrical connections between said upper and lower rails to a reversible motor whereby the gravity movement of said truck off the central insulated portion on one side will cause the motor to run in one direction and off the insulator on the other side to reverse the motor, a source of electrical power, means connected to said motor to operate the controls, and means to set said casing at different angles in relation to the aeroplane.

2. A gravity electrical means for operating the controls of an aeroplane, comprising a pivoted casing, insulated upper and lower conductor rails in said casing, an insulator truck having conductor wheels engaging said rails, electrical connections between said rails and a reversible electric motor, a neutral insulated central portion, an endless chain operated by said motor, means on said chain to operate the ailerons of the aeroplane and a source of electric energy.

In testimony whereof I have hereunto set my hand this 24th day of October A. D. 1927.

ANTON L. VEIT.